US008953852B2

(12) United States Patent
Huang et al.

(10) Patent No.: US 8,953,852 B2
(45) Date of Patent: Feb. 10, 2015

(54) METHOD FOR FACE RECOGNITION

(75) Inventors: Yea-Shuan Huang, Hsinchu (TW);
Kuo-Ta Peng, Hsinchu (TW)

(73) Assignee: Chung Hua University, Hsinchu (TW)

( * ) Notice: Subject to any disclaimer, the term of this patent is extended or adjusted under 35 U.S.C. 154(b) by 309 days.

(21) Appl. No.: 13/527,454

(22) Filed: Jun. 19, 2012

(65) Prior Publication Data
US 2013/0259324 A1 Oct. 3, 2013

(30) Foreign Application Priority Data

Apr. 3, 2012 (TW) .............................. 101111785 A

(51) Int. Cl.
*G06K 9/00* (2006.01)
(52) U.S. Cl.
USPC .......................................... 382/118
(58) Field of Classification Search
None
See application file for complete search history.

(56) References Cited

U.S. PATENT DOCUMENTS

| | | | | |
|---|---|---|---|---|
| 7,421,097 B2 * | 9/2008 | Hamza et al. | ................. | 382/118 |
| 7,596,247 B2 * | 9/2009 | Ioffe | ............................. | 382/118 |
| 7,873,208 B2 * | 1/2011 | Hamanaka | .................... | 382/154 |
| 8,264,520 B2 * | 9/2012 | Oya | ........................... | 348/14.09 |
| 8,438,163 B1 * | 5/2013 | Li et al. | ......................... | 707/737 |
| 8,457,442 B1 * | 6/2013 | Wang et al. | .................... | 382/285 |
| 8,515,136 B2 * | 8/2013 | Mori et al. | .................... | 382/118 |

* cited by examiner

*Primary Examiner* — Daniel Mariam
(74) *Attorney, Agent, or Firm* — Chun-Ming Shih

(57) ABSTRACT

A method for face recognition is provided with collecting a match facial image; retrieving a reference image from image records of a database or an input image; selecting one or more facial features from each of the match facial image and the reference image; obtaining at least one match facial feature and a match deviation of the reference image corresponding to the facial features of the match facial image; creating a match geometric model and a reference geometric model; obtaining a model deviation by comparing the match geometric model and the reference geometric model; and employing a match deviation and a model deviation to obtain a recognition score based on a predetermined rule. The method involves a two-way face recognition by integrating facial features of block matching with geometric model comparison. It employs relationship of match deviation and model deviation.

10 Claims, 3 Drawing Sheets

METHOD FOR FACE RECOGNITION

BACKGROUND OF THE INVENTION

1. Field of the Invention

The invention relates to a method for object recognition and more particularly to a method for face recognition.

2. Description of Related Art

Biometrics refers to the identification of humans by their characteristics or traits. Computer science, biometrics to be specific, is used as a form of identification and access control. For example, an employee of an amusement park may take biometric measurements from the fingers of guests to ensure that a ticket is used by the same person from day to day. It is also used to identify individuals in groups that are under surveillance.

Biometric identifiers are the distinctive, measurable characteristics used to label and describe individuals. A biometric would identify by one's face, voice, DNA, hand print or behavior. Conventionally, face recognition methods or algorithm are performed by calculating features of samples (e.g., human faces), comparing the features with stored image ore feature records, and determining whether they are matched or not.

It is understood that the more image or feature records stored in the database the more correct the face recognition method will be. However, more data means more memory and time computation are required. And in turn, it may adversely affect performance of a facial recognition system.

Thus, the need for improving the conventional method for face recognition still exists.

SUMMARY OF THE INVENTION

It is therefore one object of the invention to provide a method for face recognition comprising the steps of collecting a match facial image and a reference image; selecting one or more facial features from each of the match facial image and the reference image; obtaining at least one match facial feature and a match deviation of the reference image corresponding to the facial features of the match facial image; creating a match geometric model and a reference geometric model; obtaining a model deviation by comparing the match geometric model and the reference geometric model; and employing a match deviation and a model deviation to obtain a recognition score based on a predetermined model. The method involves a two-way face recognition by integrating facial features of block matching with geometric model comparison. It employs relationship of match deviation and model deviation.

The recognition score comprises a positive recognition score and a negative recognition score.

If the match facial image is taken from a person and the reference image is an image record stored in the database, the recognition score is defined as the positive recognition score.

If the match facial image is an image record stored in the database and the reference image is taken from a person, the recognition score is defined as the negative recognition score.

The above and other objects, features and advantages of the invention will become apparent from the following detailed description taken with the accompanying drawings.

DETAILED DESCRIPTION OF THE INVENTION

Figure 1:
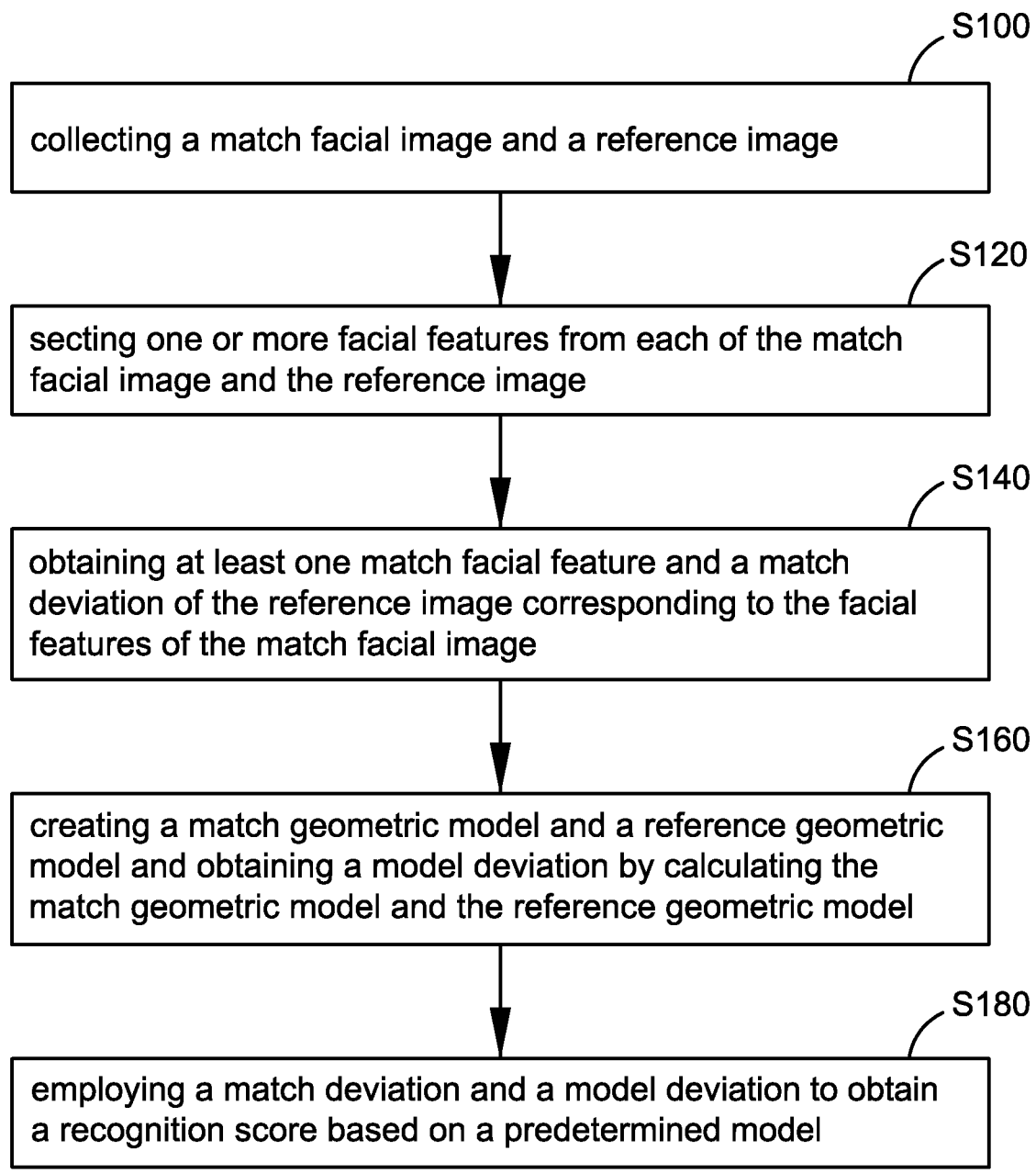
FIG. 1 is a flow chart diagram of a method for face recognition according to the invention.

Referring to FIG. 1, a flow chart diagram of a method for face recognition in accordance with the invention is illustrated. The method comprises the following steps:

In step S100, a match facial image is collected by an image taking device and a reference image is retrieved from a plurality of image records of a database or an input image. However, the match facial image can be retrieved from a plurality of image records of a database or an input image and the reference image can be collected by an image taking device.

In step S120, one or more facial features (e.g., wrinkles, speckles, cuts, or the like) are chosen from each of the match facial image and the reference image. It is noted that step S120 can be performed using a general feature point or corner point detection algorithm in nature, such as local binary pattern (LBP) and speed-up robust feature (SURF).

In step S140, at least one match facial feature and a match deviation of the reference image corresponding to the facial features of the match facial image are obtained.

In step S160, a match geometric model and a reference geometric model are created and a model deviation is obtained by calculating the match geometric model and the reference geometric model.

In step S180, a match deviation and a geometric model deviation are employed to obtain a recognition score according to a predetermined rule.

Figure 2:
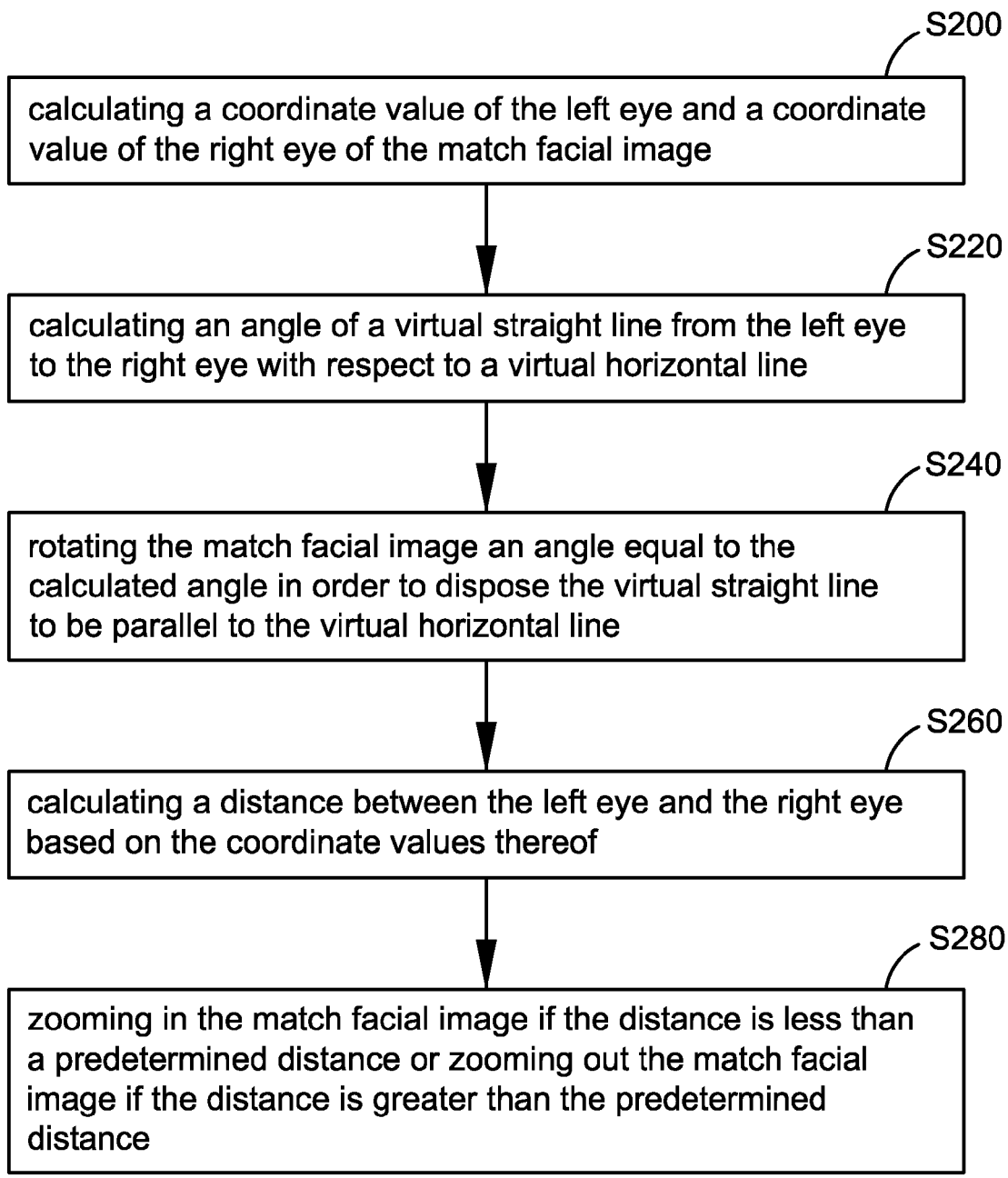
FIG. 2 is a flow chart diagram of steps prior to performing step S120 of above method.

Referring to FIG. 2 in conjunction with FIG. 1, a flow chart diagram containing a plurality of steps prior to performing steps S120 is illustrated below.

These steps are comprised of step S200 of calculating a coordinate value of the left eye and a coordinate value of the right eye of the match facial image, step S220 of calculating an angle of a virtual straight line from the left eye to the right eye with respect to a virtual horizontal line (i.e., an inclined angle of the face), step S240 of rotating the match facial image an angle equal to the calculated angle in order to dispose the virtual straight line to be parallel to the virtual horizontal line, step S260 of calculating a distance between the left eye and the right eye based on the coordinate values thereof, and step S280 of zooming in the match facial image if the distance is less than a predetermined distance (e.g., size of 30 pixels) or zooming out the match facial image if the distance is greater than the predetermined distance.

Prior to performing steps S120, both match facial image and reference image have been normalized so that they have the same predetermined image size and orientation. However, the images can be normalized by the current embodiment shown in FIG. 2 or any other known methods.

In step S140, at least one match facial feature and a match deviation of the reference image corresponding to the facial features of the match facial image are obtained. In one embodiment, a block matching is employed to find the most similar block between the match facial image and the reference image and a match pixel (i.e., valid facial feature) is obtained by choosing the center of the most similar block. While sum of squared distance (SSD) is employed to perform the block matching in the following example, it is understood by those skilled in the art that methods such as sum of absolute differences (SAD) and normalized cross correlation (NCC) are equally applicable.

$SSD_{(x, y)}(u, v)$ is employed to find a block centered on a coordinate (x, y) of the reference image and a block centered on a coordinate (x+u, y+v) of the match facial image and calculate an image deviation between above two blocks. $SSD_{(x, y)}(u, v)$ is expressed by:

$$SSD_{(x,y)}(u, v) = \sum_{f=-B}^{B} \sum_{t=-B}^{B} [I_t(x+t, y+f) - I_r(x+u+t, y+v+j)]^2$$

where $I_t$ is a match facial image, $I^*$ is a reference image, (x, y) is the coordinate of facial feature of the reference image, (u, v) is the displacement, and B is the radius of a block.

The smaller of the image deviation the higher of the similarity between the block centered on a coordinate (x, y) of the reference image and the block centered on a coordinate (x+u, y+v) of the match facial image is and vice versa.

R is taken as a search radius of block matching with respect to the facial features. Image deviation of each image in a block having the radius R of the match facial image cam be calculated using $SSD_{(x, y)}(u, v)$ with respect to the coordinate (x, y) of the reference image. Further, a displacement coordinate (u, v) having a minimum deviation in the search block is found and the displacement coordinate (u, v) is taken as optimum displacement (u*, v*) as below.

$$SSD_{(x,y)}(u^*, v^*) = \arg \min_{\substack{-R \le u \le R \\ -R \le v \le R}} SSD_{(x,y)}(u, v)$$

Thereafter, a match facial feature (i.e., the optimum match location) P and a match deviation $MD_{(x, y)}$ can be found and expressed as follows:

P=(x+u*, y+v*)

$MD_{(x, y)} = SSD_{(x, y)}(u^*, v^*)$

As a result, an optimum location of the match facial image corresponding to a facial features of the reference image is found.

It is supposed that there are K facial features in the reference image. $MD_i$ represents the match deviation of the ith facial features. $w_i$ represents the weight of the ith facial features. Average match deviation (AMD) is expressed below.

$$AMD = \frac{\sum_{i=1}^{K} w_i \times MD_i}{\sum_{i=1}^{K} w_i}$$

Figure 3:
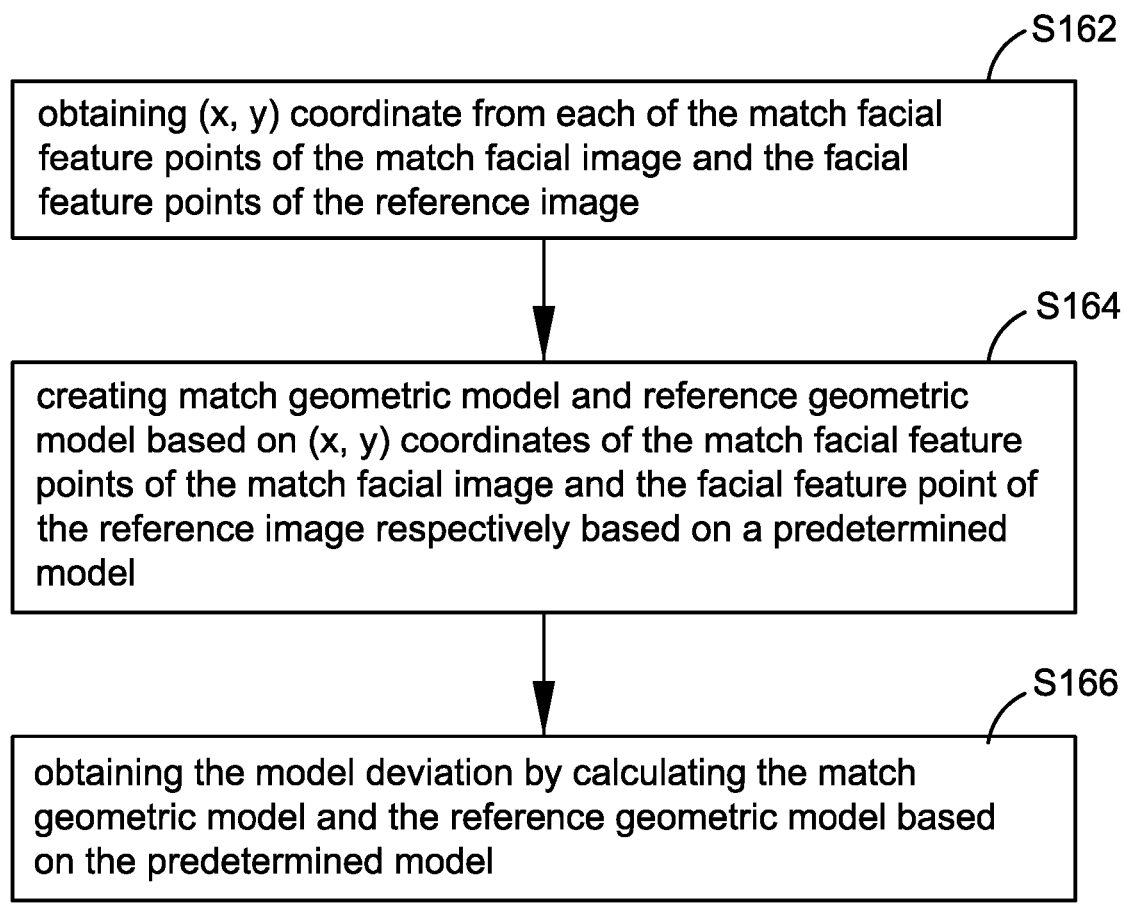
FIG. 3 is a flow chart diagram of sub-steps of step S160 of above method.
Figure 4:
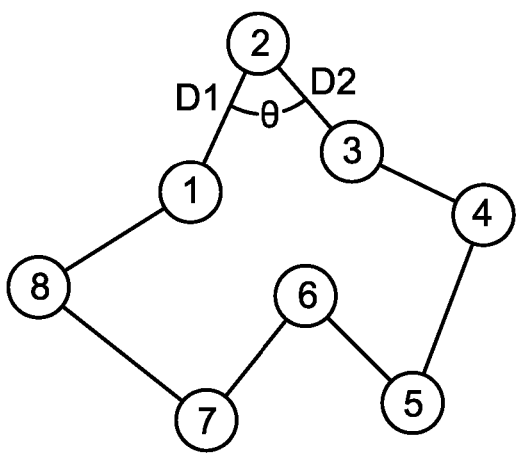
FIG. 4 schematically depicts a geometric model for the method for face recognition according to the invention.

Referring to FIGS. 3 and 4 in conjunction with FIG. 1, the flow chart diagram of the method for face recognition of the invention is further illustrated.

In step S160, a match geometric model and a reference geometric model are created and a model deviation is obtained by calculating the match geometric model and the reference geometric model.

Geometric model is employed to describe the structural relationship of facial features. For example, relationship between two points, direction, or an angle defined by three points. In detail, the match geometric model corresponds to the structural relationship among the match facial features of the match facial image, and the reference geometric model corresponds to the structural relationship among the facial features of the reference image.

Step S160 comprises the following sub-steps:

In sub-step S162, an (x, y) coordinate is obtained from each of the match facial feature points of the match facial image and the facial feature points of the reference image.

In sub-step S164, a match geometric model and a reference geometric model are created based on the (x, y) coordinates of the match facial feature points of the match facial image and the facial feature point of the reference image respectively according to a predetermined model.

In sub-step S166, a model deviation is obtained by calculating the match geometric model and the reference geometric model according to the predetermined model.

The purpose of creating a geometric model is to describe a point-to-point relationship. Thus, a plurality of different configurations of the geometric model can be realized. In FIG. 4, a ring geometric model is shown. Each vertex is represented by a numeral of equal weight. $x_i$ and $y_i$ represents the horizontal coordinate value and the vertical coordinate value of the ith feature point respectively. An angle θ is defined for any two joined segments (e.g., segment D1 and segment D2) as expressed below.

$$D1 = [x_{i-1} - x_i, y_{i-1} - y_i]^T$$

$$D2 = [x_{i+1} - x_i, y_{i+1} - y_i]^T;$$

and $$\theta = \cos^{-1} \frac{D_1 \cdot D_2}{\|D_1\| \|D_2\|}$$

In the embodiment (see FIG. 4), a geometric model G having 16 values can be obtained from the eight vertices. Hence, 2N geometric models can be obtained from N vertices where N is the number of feature points. The obtained match geometric model and the obtained reference geometric model in sub-step S166 can be employed to calculate a model deviation GD. For example, segment Di means a distance between the (i−1)th point and the ith point. θi is angle of the ith point. The reference geometric model and the match geometric model are expressed below.

$RG = (r_{D_1}, r_{D_2}, \ldots, r_{D_N}, r_{\theta_1}, r_{\theta_2}, \ldots r_{\theta_N})$ The $MG = (m_{D_1}, m_{D_2}, \ldots, m_{D_N}, m_{\theta_1}, m_{\theta_2}, \ldots m_{\theta_N})$ model deviation GD can be expressed below using Euler's formula.

$$GD = \frac{\sqrt{\sum_{i=1}^{N}(r_{D_i} - m_{D_i})^2} \times \sqrt{\sum_{i=1}^{N}(r_{\theta_i} - m_{\theta_i})^2}}{K}$$

In step S180, a match deviation MD and a model deviation GD are employed to obtain a recognition score S according to a predetermined rule and the recognition score S is expressed below (i.e., as an inverse of the product of the match deviation MD and the model deviation GD).

$$S = \frac{1}{MD \times GD}$$

The larger of the recognition score S the match facial image is more similar to the reference image.

A geometrical model can be obtained using one of different algorithms. Each facial feature can correspond to different weights. Above ring geometric model is taken as an exemplary example of the invention for ease of discussion. Above step S160 is not limited to the described implementation.

Match facial image is a test image taken by an image taking apparatus. Reference image is one of a plurality of image records stored in a database. The method of the invention can determine whether the two facial images identify the same person by comparing the match facial image with the reference image.

In a preferred embodiment, a match facial image is taken from a person (i.e., input image) and a reference image is an image record stored in the database and thus the recognition score S is defined as a positive recognition score.

In an alternative preferred embodiment, a match facial image is an image record stored in the database and a reference image is taken from a person (i.e., input image) and thus the recognition score S is defined as a negative recognition score.

The above two embodiments are call two-way face recognition. It is noted that the only difference between the positive recognition score and the negative recognition score is the image being chosen rather than steps being performed. The method of face recognition of the invention can be performed from steps S100 to S180 to obtain a positive recognition score in one time and a negative recognition score in a next time by defining the match facial image and the reference image differently. Thus, the sum of the positive recognition score and the negative recognition score is taken as a recognition score of the invention.

In brief, the method for face recognition of the invention involves a two-way face recognition by integrating facial features of block matching with geometric model comparison. Further, it employs relationship of match deviation and model deviation. As a result, face recognition effectiveness is greatly improved.

While the invention has been described in terms of preferred embodiments, those skilled in the art will recognize that the invention can be practiced with modifications within the spirit and scope of the appended claims.

What is claimed is:

1. A method for face recognition comprising the steps of:
    (a) collecting a match facial image and a reference image from an image taking device and an image record of a database, respectively;
    (b) normalizing the match facial image and the reference image to have a same predetermined image size and orientation;
    (c) selecting one or more facial feature points from each of the match facial image and the reference image;
    (d) obtaining corresponding matched facial feature points of the reference image and an average match deviation (AMD) for at least one facial feature point of the match facial image;
    (e) creating a match geometric model by using the at least one facial feature point of the match facial image, and a reference geometric model by using the corresponding matched facial feature points of the reference image;
    (f) obtaining a geometric model deviation (GD) by comparing the match geometric model and the reference geometric model; and
    (g) employing the average match deviation (AMD) and the geometric model deviation (GD) to obtain a recognition score (S) based on a predetermined rule,
    wherein one possibility of the predetermined rule is shown as below, and $S=1/AMD \times GD$ wherein the method is performed using a computer.

2. The method of claim 1, wherein step (d) is performed using a local binary pattern (LBP), speed-up robust feature (SURF) or other feature points or corner point detection algorithm.

3. The method of claim 1, wherein step (b) further comprises the steps of:
    (1) calculating a coordinate value of the left eye and a coordinate value of the right eye of the match facial image and the reference image;
    (2) calculating an angle of a virtual straight line from the left eye to the right eye with respect to a virtual horizontal line;
    (3) rotating the match facial image and the reference image with their individually calculated angles in order to dispose the virtual straight line to be parallel to the virtual horizontal line;
    (4) calculating a distance between the left eye and the right eye based on the coordinate values thereof; and
    (5) either zooming in the match facial image and the reference image if the distance is less than a predetermined distance or zooming out the match facial image if the distance is greater than the predetermined distance.

4. The method of claim 3, wherein the predetermined distance can be size of 30 pixels or other suitable number of pixels.

5. The method of claim 1, wherein step (d) is done by employing a block matching.

6. The method of claim 5, wherein the block matching is selected from the group consisting of sum of squared distance (SSD), sum of absolute differences (SAD), and normalized cross correlation (NCC).

7. The method of claim 1, wherein steps (f) and (e) comprise the sub-steps of:
    (i) obtaining a (x, y) coordinate from each of the match facial feature points of the match facial image and the corresponding matched facial feature points of the reference image;
    (ii) creating a match geometric model based on the (x, y) coordinates of the match facial feature points of the match facial image according to a first predetermined model;
    (iii) creating a reference geometric model based on the (x, y) coordinates of the corresponding matched facial feature points of the reference image according to the predetermined model;
    (iv) obtaining a model deviation by calculating the match geometric model and the reference geometric model according to a second predetermined model.

8. The method of claim 7, wherein the recognition score comprises forward recognition score and a reverse recognition score.

9. The method of claim 8, wherein the match facial image is taken from a person and the reference image is an image record stored in the database when the recognition score is defined as the forward recognition score, and the match facial image is an image record stored in the database and the reference image is taken from a person when the recognition score is defined as the reverse recognition score.

10. The method of claim 9, wherein the recognition score is a sum of the forward recognition score and the reverse recognition score.

* * * * *